April 15, 1958 W. P. BOOTHROYD 2,831,052

COLOR TELEVISION RECEIVER BEAM REGISTRATION SYSTEM

Filed Jan. 28, 1953

INVENTOR.
WILSON P. BOOTHROYD
BY
Cleen V. Hagstrum
ATTORNEY

United States Patent Office 2,831,052

Patented Apr. 15, 1958

2,831,052

COLOR TELEVISION RECEIVER BEAM REGISTRATION SYSTEM

Wilson P. Boothroyd, Huntingdon Valley, Pa., assignor to Philco Corporation, Philadelphia, Pa., a corporation of Pennsylvania Application January 28, 1953, Serial No. 333,750

15 Claims. (Cl. 178—5.4)

Figures 1, 2:
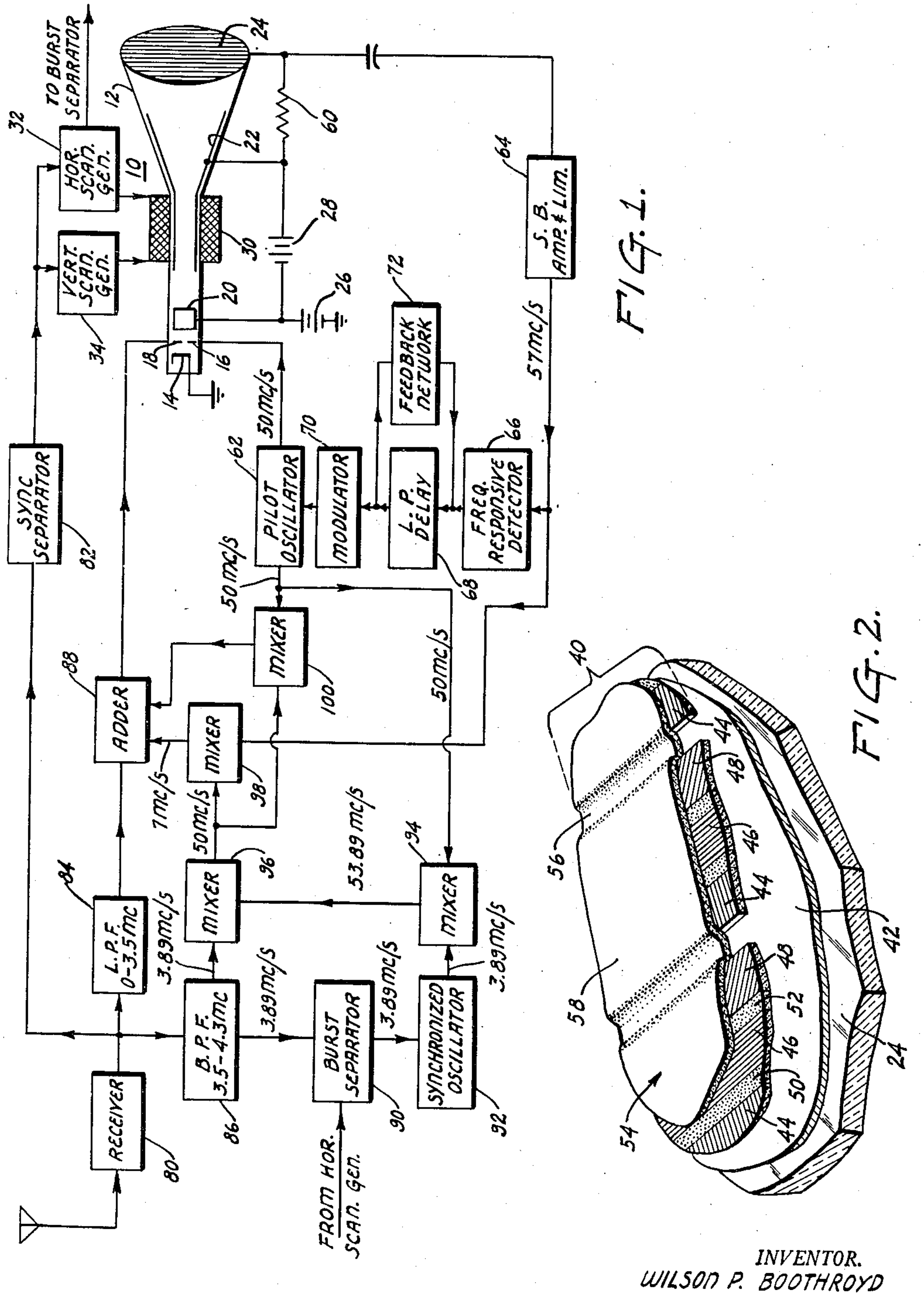

The present invention relates to electrical systems and more particularly to cathode-ray tube systems comprising a beam intercepting structure and indexing means arranged in cooperative relationship with the beam intercepting structure and adapted to produce a signal indicative of the position of the cathode-ray beam.

The invention is particularly adapted for, and will be described in connection with, a color television image presentation system utilizing a single cathode-ray tube having a beam intercepting, image forming screen member comprising vertical stripes of luminescent materials. These strips are preferably arranged in laterally displaced color triplets, each triplet comprising three vertical phosphor stripes which respond to electron impingement to produce light of the different primary colors. The order of arrangement of the stripes may be such that the normal horizontally scanning cathode-ray beam produces red, green and blue light successively. From a color television receiver there may then be supplied a video signal wave having signal components definitive of the brightness and chromaticity of the image to be reproduced, which wave is utilized to control the intensity of the cathode-ray beam to the required instantaneous value as the beam scans the phosphor stripes.

The video color wave may be generated at the transmitter by means of appropriate camera units producing three signals indicative of three color specifying parameters of the successively scanned elements of a televised scene. These three signals are preferably such as to specify the image colors with respect to three imaginary color primaries "X," "Y" and "Z" as defined by the International Commission on Illumination (ICI). With this choice of primaries, the Y signal represents the brightness of the image as perceived by the human eye, while the X and Z signals contain the remaining intelligence as to image color. Since the specification of any color in terms of any given set of primaries may be converted to a specification the same color in terms of another set of primaries by means of linear transformations, the transmission of the X, Y and Z signals makes available at the receiver all the required information necessary to excite three real primary color sources of the image reproducing cathode-ray tube.

In a preferred arrangement for segregating and apportioning the intelligence concerning the X, Y and Z components of the color of the image elements at the transmitter, these components are combined to form two difference signals, $(X-Y)$ and $(Z-Y)$, which are transmitted in different phase relations as amplitude modulation of a subcarrier signal. The Y signal is then transmitted in the frequency band located below that of the modulated subcarrier. The modulation of the subcarrier is preferably effected by means of balanced modulators, so that no subcarrier signal is generated when the difference signals $(X-Y)$ and $(Z-Y)$ are zero, i. e. when image elements which are white or gray are scanned. However, when colored image elements are scanned, either or both of the difference signals $X-Y$ and $Z-Y$ will differ from zero, producing a subcarrier signal having a phase determined by the relative values of the difference signals and hence by the hue of the image, and an amplitude determined by the absolute values of the difference signals and hence by the saturation of the image color. The modulated subcarrier signal therefore may be considered as a chromaticity signal having a phase and amplitude representative of the hue and saturation respectively, of the color of the image elements.

The instantaneous amplitude of the video signal will be a function of the magnitude of the three components thereof and of the absolute phase positions of the two components constituting the modulated subcarrier signal, and at any given instant the amplitude will be indicative of the intensity of one of the primary color constituents of an element of the image to be reproduced. For proper color rendition, it is required that, as the phosphor strips producing a given one of the primary colors of light of a particular image element is impinged by the cathode-ray beam, the intensity of the beam be simultaneously controlled in response to the contemporaneous value of the video signal representing the corresponding color component of the televised image. Such a synchronous relationship may be maintained throughout the scanning cycle by deriving an indexing signal indicative of the instantaneous position of the cathode-ray beam upon the image forming screen, and by utilizing this signal to control the relative phase of the video wave.

The indexing signal may be derived from a plurality of beam responsive signal generating regions of the beam intercepting screen structure, which regions are arranged in a geometric configuration indicative of the geometric configuration of the phosphor stripes so that, when the beam scans the screen, the indexing regions are excited in spaced time sequence relative to the scanning of the color triplets and the desired indexing signal is generated in a suitable output electrode system of the cathode-ray tube. In one form the indexing regions may be constituted by a layer of a material exhibiting secondary electron emissive properties at specified striped portions thereof different from the secondary emissive properties at other portions thereof. Such differences in secondary electron emissivities may be attained by an underlying layer exhibiting at the corresponding portions different values of resistance to electron flow, as disclosed and claimed in the copending application of William E. Bradley and Meier Sadowsky, Serial No. 313,018, filed October 3, 1952.

In another form, the indexing regions may consist of stripes of a material having secondary emissive properties which differ from the secondary emissive properties of the remaining portions of the beam intercepting structure. For example, such indexing portions may consist of stripes of a high atomic number material such as gold, platinum or tungsten, or may consist of certain oxides such as cesium oxide or magnesium oxide. Alternatively, the indexing portions may consist of stripes of fluorescent material, such as zinc oxide, having a spectral output in the non-visible light region, and the indexing signals may be derived from a suitable photoelectric cell arranged, for example, in a sidewall portion of the cathode-ray tube out of the path of the cathode-way beam and facing the beam intercepting surface of the screen structure.

To achieve a desired degree of definition comparable to that commonly available in so-called black and white image reproducers, the image reproducing screen of the cathode-ray tube should contain a relatively large number of groups of phosphor stripes. In the case of a cathode-ray tube screen constituted by vertically arranged color triplets, the number of triplets should correspond to the number of picture elements contained in one line scan of the reproduced image, and in a typical case there may be approximately 400 to 450 color triplets arranged on the screen of the cathode-ray tube and a corresponding number of stripe-like indexing regions.

As a general rule, the rate at which the beam scans the phosphor stripes and the associated indexing regions can be maintained constant only within certain tolerance values. This is due to the fact that the phosphor stripes and the indexing regions are normally formed on the screen surface with only a certain degree of precision dictated by economic considerations and manufacturing tolerances, so that a non-uniform distribution of these components on the screen surface can normally be expected. Furthermore, and as a practical matter, it is not feasible to correlate exactly the waveform of the signal energizing the deflection system of the cathode-ray tube with the geometry of the image screen, so that non-uniformities of the scanning rate can additionally be expected from this source.

The departures from constant velocity, as the beam scans the screen structure, produce corresponding changes in the frequency of the indexing signal produced by the screen structure.

In the copending application of E. M. Creamer, Jr., et al., Serial No. 240,324, filed August 4, 1951, now U. S. Patent No. 2,667,534, dated January 26, 1954, there have been described systems by means of which the desired indexing information can be obtained in a readily usable form. More particularly, and in accordance with the principles set forth in that copending application, use is made of the finding that the scanning of the indexing regions by the electron beam produces, in the collector circuit of the cathode-ray tube, signal components which represent modulation products as determined by the intensity variations of the beam and the rate of scanning the indexing regions. Accordingly, by additionally varying the intensity of the beam at a pilot carrier rate different from the rate at which the beam intensity is varied by the video signal, an output signal is produced in the collector electrode of the cathode-ray tube comprising, as one component, modulation products proportional to the pilot carrier frequency and the rate of scanning the indexing regions. Because the frequencies of these modulation products are different from the frequencies of any modulation products brought about by the video signal variations of the beam, the former may be separated from the latter by suitable frequency discriminating means. These pilot carrier modulation products consist essentially of a carrier wave, at a pilot carrier frequency, and sideband signals representing the sum and difference of the pilot carrier frequency and the rate of scanning the indexing regions. Since changes in the rate of scanning the indexing regions will be indicated by a change in the frequencies of the sideband signals, one of these sideband signals may be used as an indexing signal.

The desired sideband signal must be separated from undesired signal components also generated at the screen structure by the scanning beam, and must be appropriately amplified to make it suitable for controlling the phase of the video signal applied to the beam intensity controlling system in the desired synchronous relationship to the position of the scanning beam. The selector circuits commonly available for this purpose generally apply to the selected signal a phase shift which varies as a function of the frequency thereof so that the processed signal may no longer be in phase coincidence with the generated indexing signal for all frequency values of the generated indexing signal.

In the copending application of M. E. Partin, Serial No. 329,809, filed January 6, 1953, it has been proposed to avoid these phase variations by frequency modulating the pilot carrier signal, which intensity modulates the cathode-ray beam, in a direction and to an extent such as to maintain substantially constant the frequency of the sideband signal which serves as the source of the indexing information. To frequency modulate the pilot carrier signal there is provided a frequency sensitive detector adapted to produce a control signal having an amplitude determined by the deviation of the frequency of the selected sideband signal about its nominal frequency value. The control signal so produced serves to actuate a variable reactance element coupled to the source of the pilot carrier signal so that, as the beam scans the image screen, variations of the scanning rate, which normally produce frequency deviations of the selected sideband signal, are directly compensated by a corresponding change in the frequency of the pilot carrier in a direction such as to maintain the frequency of the sideband at a constant value. It has been found that control of the frequency of the pilot signal in the manner above described may be accompanied by a time lag which, in the case of high definition color image reproducing systems, may be sufficient to bring about a misphasing of the indexing information and consequent deterioration of the colors of the reproduced image. When it is attempted to reduce this time lag, it is found that the stability of the system may be seriously impaired.

It is an object of the invention to provide improved cathode-ray tube systems of the type in which the position of an electron beam on a beam intercepting screen structure is indicated by an indexing signal derived from an indexing component of the screen structure.

Another object of the invention is to provide improved cathode-ray tube systems in which undesired phase variations of the indexing signal normally produced in the processing thereof are obviated.

Another object of the invention is to provide a color television cathode-ray reproducing system in which accurate color rendition is achieved notwithstanding non-uniformities of the distribution and scanning rate of the color reproducing elements of the image screen of the cathode-ray tube.

Further objects of the invention will appear as the specification progresses.

In accordance with the invention, in a cathode-ray tube system adapted to generate an indexing signal indicative of the position of the beam, the foregoing objects are achieved by means of an indexing system in which a signal derived from the indexing information generated during a given line scanning interval, and modified as hereinafter described, serves to control the relationship between the phase of the color video signal applied to image tube and the position of beam on the image screen during a line scanning period subsequent to the given line scanning period. More particularly, and in a preferred embodiment of the invention in which the indexing information is derived from a sideband signal produced by scanning the indexing regions of the image screen by means of an electron beam which is intensity modulated by a pilot carrier signal, the foregoing objects of the invention are achieved by modulating the frequency of the pilot carrier signal in a sense such as to maintain the frequency of the selected sideband signal at a substantially constant value during a given line scanning period by means of a control signal derived from the indexing information produced during a preceding line scanning period. As a further feature of the invention, the control signal is continuously regenerated and modified during the successive line scanning periods so that the control signal generated during the initial line scanning period is continuously corrected during successive line scanning periods in a sense such as to maintain the frequency of the selected sideband signal at a substantially constant frequency value notwithstanding differences of the beam scanning rate during successive line scanning periods.

The invention will be described in greater detail with reference to the appended drawings forming part of the specification and in which:

Figure 1 is a block diagram, partly schematic, showing one embodiment of a cathode-ray tube system in accordance with the invention; and Figure 2 is a perspective view of a part of one form of an image reproducing screen structure for the cathode-ray tube systems of the invention.

Referring to Figure 1, the cathode-ray tube system there shown comprises a cathode-ray tube 10 containing, within an evacuated envelope 12, a dual beam generating and intensity control system comprising a cathode 14, control electrodes 16 and 18, a focusing anode 20 and an accelerating anode 22, the latter of which may consist of a conductive coating on the inner wall of the envelope which terminates at a point spaced from the end face 24 of the tube 10 in conformity with well established practice. Suitable forms of construction for the dual beam generating system have been described in the copending application of M. E. Partin, Serial No. 242,264, filed August 17, 1951, and a further description thereof herein is believed to be unnecessary. Electrodes 20 and 22 are maintained at their desired operating potentials by suitable volting sources shown as batteries 26 and 28, the battery 26 having its positive pole connected to the anode 20 and its negative pole connected to a point at ground potential and the battery 28 being connected with its positive pole to electrode 22 and its negative pole to the positive pole of battery 26.

A deflection yoke 30 coupled to horizontal and vertical scanning generators 32 and 34 respectively, of conventional design, is provided for deflecting the dual electron beams across the faceplate 24 to form a raster thereon.

The faceplate 24 of the tube 10 is provided with a beam intercepting structure 40, one suitable form of which is shown in Figure 2. In the arrangement shown, the structure 40 is formed directly on the faceplate 24. However, it should be well understood that the structure 40 may be formed on a suitable light transparent base which is independent of the faceplate 24 and may be spaced therefrom.

The faceplate 24 is provided with a light transparent, electrically conductive coating 42 which may be of stannic oxide or of a metal such as silver, having a thickness only sufficient to achieve the desired conductivity. Superimposed on the coating 42 are a plurality of parallelly arranged stripes 44, 46 and 48 of phosphor materials which, upon impingement of the cathode-ray beam, fluoresce to produce light of three different primary colors. For example, the stripe 44 may consist of a phosphor such as zinc phosphate containing manganese as an activator, which upon electron impingement produces red light, the stripe 46 may consist of a phosphor such as zinc orthosilicate, which produces green light, and the stripe 48 may consist of a phosphor such as calcium magnesium silicate containing titanium as an activator, which produces blue light. Other suitable materials which may be used to form the phosphor strips 44, 46 and 48 are well known to those skilled in the art, as well as methods of applying the same to the faceplate 24, and further details herein concerning the same are believed to be unnecessary.

Each of the groups of stripes may be termed a color triplet, and the sequence of the stripes is repeated in consecutive order over the area of the structure 40.

The desired indexing signal is generated in the manner described and claimed in the above-mentioned copending application of William E. Bradley and Meier Sadowsky. More particularly, and in accordance with one arrangement described in said application, the phosphor strips 44, 46 and 48 are arranged in spaced relationship as shown in Figure 2 and the spacing between stripes 44—46 and between stripes 46—48 are filled with an electrically insulting material such as unactivated willemite, the said strips so formed being shown as 50 and 52 respectively. Arranged over the stripes 44, 46, 48, 50 and 52, and in contact with the coating 42 at the spaces between strips 44—48, is a coating 54 of a material adapted to exhibit different secondary emissive properties as determined by the resistance to electron flow of the underlying layer. Such a material may be magnesium oxide, which, in the construction shown, exhibits, at its portions 56 in contact with the conductive layer 42, a secondary electron emissivity different from that exhibited by its portions 58 overlying the stripes 46, 48, 50 and 52.

The beam intercepting structure so constituted is connected to the positive pole of battery 28 through a load impedance 60 (see Figure 1) by means of a suitable connection to the conductive coating 42 thereof.

Since the dual cathode-ray beams are deflected by the common deflection yoke 30, they simultaneously scan the beam intercepting structure 40, and indexing information derived from one of the beams may be used to establish the position of the other beam. When one of the beams, such as the beam under the control of electrode 16 is varied in intensity at a pilot frequency, for example by means of a pilot oscillator 62, the so varied beam will generate across the load resistor 60 an indexing signal comprising a carrier component at the pilot frequency and sideband components representing the sum and difference frequencies of the pilot frequency and the rate at which the indexing stripes are scanned by the beam as described in the above-mentioned copending application of E. M. Creamer, Jr. et al.

In a typical case, the pilot frequency variations of the intensity of the beam may occur at a nominal frequency of 50 mc./sec. and, when the rate of scanning the indexing stripe regions 56 of the beam intercepting structure 40 (see Figure 2) is nominally 7 million per second, as determined by the horizontal scanning rate and the number of indexing regions impinged per scanning period, a modulated signal comprising a carrier component at 50 mc./sec. and sideband components at 43 mc./sec. and 57 mc./sec. is produced across load resistor 60. Changes in the rate of scanning the indexing regions due to non-linearities of the beam deflection and/or non-uniformities of the spacing of the indexing regions produce corresponding changes in the frequencies of the sideband components with respect to the frequency of the carrier component—i. e. the sideband components undergo frequency deviations proportional to the variations of the rate of scanning the indexing signal, and accordingly one of these sideband components may be used to supply the desired indexing information.

In the arrangement specifically shown in Figure 1, the upper sideband component at approximately 57 mc./sec. is used for supplying the desired indexing information and this sideband component is preferentially selected from the remaining signal components generated across load impedance 60 by means of a sideband amplifier 64 having a restricted pass band characteristic centered about this nominal frequency value. Amplifier 64 may be of conventional form and may be made to exhibit a restricted pass band characteristic in any well known manner, for example by means of a resonant circuit broadly tuned to the nominal frequency of the desired sideband or by an equivalent filter system.

In accordance with the invention, the indexing information which is produced during a given scanning interval is modified according to the changes in the indexing information produced during successive scanning intervals and the resultant modified signal serves to control the relationship between the phase of the video color wave applied to the image tube and the scanning position of the beam during subsequent scanning periods. In the system shown in Figure 1, this is achieved by a control system adapted to frequency modulate the oscillator 62 and comprising a frequency responsive detector 66 coupled to the output of amplifier 64, a low pass delay system 68 energized by the output of detector 66, a modulator 70 energized by the delay system 68, and a feedback network 72 shunting the delay system 68 and having its input connected to the output of the delay system and its output coupled to the input of the delay system.

Detector 66 may be of well known form and may consist, for example, of a Foster-Seeley type frequency discriminator having its cross-over frequency equal to the nominal frequency of the sideband component transmitted by the amplifier 64. The low pass delay system 68 may consist of a low pass filter of conventional form having a time delay which is equal to one line scanning period, or a multiple of this period, minus the time delay occurring in the amplifier 64, the detector 66, modulator 70 and the oscillator 62, so that the time delay through the series loop circuit so formed is equal to one line scanning period or a multiple of this period. In practice the detector 66, modulator 70 and oscillator 62 exhibit relatively wide-band characteristics and a relatively small time delay, whereas the amplifier 64 exhibits a narrow-band characteristic with a relatively large time delay, so that the time delay embodied in the delay system 68 is made equal to one line scanning period, or a multiple thereof, minus the time delay in amplifier 64. Modulator 70 may consist of a variable reactance device such as a Miller-type reactance tube which is coupled to the frequency determining system of the oscillator 62 and which is adapted to vary the resonant frequency thereof as determined by the amplitude of a control signal applied to the input of the reactance tube. The feedback network 72 may consist of a variable gain amplifier of conventional construction and exhibits a time delay as determined by the time delay of the amplifier 64, so that the series loop circuit formed by the delay system 68 and the network 72 exhibits a delay equal to one or more line scanning periods.

The system so far described operates in the following manner:

At the start of the scanning period, i. e. at the initiation of the operation of the cathode-ray tube 10, and during the first line scanning period, pilot oscillator 62 operates at a given frequency determined by the constants thereof, e. g. at 50 mc./sec. As the beam scans the indexing regions of the image screen of tube 10, there will be produced across the load impedance 60 an indexing signal in the form of a modulated carrier wave having a carrier frequency at 50 mc./sec. and sideband components at 43 and 57 mc./sec., assuming the typical frequency values previously given. Variations of the scanning rate of the indexing regions due to departures of the indexing regions from the ideal configuration and/or due to non-linearities of the deflection system of the tube 10, produce corresponding frequency deviations about the nominal frequency value of the sideband signal derived from the amplifier 64. The frequency deviations of the sideband signal in turn produce, at the output of the frequency sensitive detector 66, a control signal having amplitude and sense variations corresponding to the extent and direction of the deviations. The control signal so derived from the detector 66 is supplied to the modulator 70 through the delay system 68, and, because of the time delay so introduced, the control signal is effective to vary the frequency of oscillator 62 during a subsequent line scanning period of beam of the tube 10, i. e. during the second horizontal scanning period. Since the oscillator 62 is thus frequency modulated during the second line scanning period in a sense such as to maintain the selected sideband signal at a substantially constant frequency value during the second scanning period, the output of detector 66 would normally be zero during this period except for a difference signal later to be referred to, and no indexing information would be available for actuating the modulator 70 during the third line scanning period. However, it will be noted that the output of the delay system 68 is also coupled to the input thereof by the feedback network 72, so that, during the second horizontal scanning period, the control signal appearing at the output of the delay system 68 is reapplied to the input of the delay system and is thus available for controlling the modulator 70 during the third line scanning period. This action continues for subsequent line scanning periods and if there are no differences between the scanning variations occurring in the consecutive line scanning periods—in which case the signal at the output of amplifier 64 remains at a constant frequency value—the control signal in the form initially generated by detector 66 during the first line scanning period is repeatedly used for varying the frequency of oscillator 62 during each of the successive line scanning periods.

In practice, the variations of the rate at which the beam scans the indexing regions during a given line scanning period are not the same as the variations of the rate at which the beam scans the indexing regions during the subsequent line scanning periods. These changes in the "scanning pattern" during the consecutive line scanning periods may be due to small and unavoidable changes in the relative positions of the indexing regions between the top and the bottom of the image screen area, to changes in the waveform of the deflection signal during successive scanning periods and/or to the geometry of the image screen which presents progressively different contours to the effective deflection center of the beam as the beam is deflected from the top to the bottom of the image screen. When changes in the scanning pattern occur, corresponding deviations of the frequency of the sideband signal selected by the amplifier 64 are produced, and these deviations in turn produce a corresponding signal at the output of detector 66. This difference or error signal produced by detector 66 is impressed on the control signal currently being recirculated through the delay system 68 by the feedback network 72 and produces a modified control signal serving to vary the frequency of oscillator 62 in accordance with the newly established scanning pattern during the following line scanning period.

It will be recognized that while the scanning patterns of remotely located line scansions may differ markedly, the scanning pattern of successive line scanning periods differ from each other by only small amounts so that the indexing information produced during one line scanning period may satisfactorily be used for a number of successive line scanning periods without degrading the reproduced image. Furthermore, since the scanning pattern of the consecutive line scansions changes form at only a relatively slow rate, the frequency deviations of the signal processes by the amplifier 64 occur at a low rate so that substantially no phase variations are imparted to the processed signal by the amplifier 64 not withstanding its relatively narrow bandpass characteristic.

Since the variations of the scanning rate during each line scansion are compensated by varying the frequency of the oscillator 62, the indexing information is accordingly effectively transferred to the signal produced by the pilot oscillator 62, and this information may be used in any of several manners to establish the required relationship between the phase of the video color wave supplied to the color image tube and the position of the scanning beam thereof. More particularly, and in the arrangement shown in Figure 1 for supplying a color video wave to control grid 18 of cathode-ray tube 10, there is provided a receiver 80 which may be of conventional design and include the usual radio frequency amplifier, frequency conversion and detector stages for producing a color video signal.

In a typical form, the color video signal comprises time-spaced horizontal and vertical synchronizing pulses recurrent at the horizontal and vertical scanning frequencies, and the color video wave occurring in the interval between the horizontal pulses. The incoming video signal may further include a marker signal for providing a phase reference for the color establishing component of the color video wave, such a marker being usually in the form of a burst of a small number of cycles of carrier signal having a frequency equal to the frequency of the chromaticity subcarrier component of the video wave and occurring during the so-called back porch interval of the horizontal scanning pulses.

The synchronizing pulses contained in the received video signal are selected by a sync signal separator 82 of conventional form and subsequently energize, in well known manner, the horizontal and vertical scanning generators 32 and 34.

The video color wave is separated into its two components by means of a low pass filter 84 and a bandpass filter, whereby, at the output of filter 84, there is derived the low frequency component of the video wave containing the brightness information of the image and at the output of the filter 86 there is derived the modulated subcarrier component of the video wave indicative of the chromaticity information of the image and the marker signal. The frequency pass bands of the filters 84 and 86 are selected in conformity with the standards of the transmission system and a typical value for the pass band of filter 84 is 0 to 3.5 mc./sec. and for the filter 86 is 3.5 to 4.3 mc./sec. when the subcarrier frequency of approximately 3.89 mc./sec. is used at the transmitter.

The brightness signal is supplied to the control grid 18 of the tube 10 through an adder 88 having a plurality of inputs and a common output and consisting, in a typical case, of a plurality of thermionic tubes, the input grid circuits of which are separately energized by the respective input signals applied to the adder, and the output anode circuits of which are supplied through a common load impedance.

The marker signal is separated from the video wave by means of a gated path operated in synchronism with the occurrence of the marker signal. For this purpose, there is provided a burst separator 90 consisting, for example, of a dual grid thermionic tube having one control grid which is coupled to the output of the bandpass filter 86 and a second control grid so negatively biased as normally to prevent conduction through the tube. The tube is made conductive at the proper instant, i. e. during the back porch interval of the horizontal synchronizing pulses, by means of a positive pulse which may be derived from the output of the horizontal scanning generator 32 in well known manner and which is applied to the said second control grid to override the normal blocking bias. The burst separator may also contain a filter for attenuating undesirable signals at the output thereof; i. e. the separator may contain a resonant circuit which is tuned to the frequency of the marker signal and which is connected to the anode of the tube.

The marker signal so provided is applied to an oscillator 92 which is adapted to generate a signal having a frequency and a phase position as established by the frequency and phase position of the marker signal applied to the input thereof. In a suitable form the oscillator 92 may be of the type described in the copending application of Joseph C. Tellier, Serial No. 197,551, filed November 25, 1950.

The chromaticity information, in proper phase as determined by the marker signal and the indexing information, are supplied to the electrode 18 by means of a heterodyne mixer 94 having one input supplied by the oscillator 92 and a second input supplied by the pilot oscillator 62, a second mixer 96 having one input supplied by the bandpass filter 86 and a second input supplied by the mixer 94, and a third mixer 98 having one input supplied by the output of mixer 96 and a second input supplied by the amplifier 64. The heterodyne mixers 94, 96 and 98 may be of conventional form and may each consist of a dual grid thermionic tube, to the different grids of which the two input signals are supplied. The mixers also contain an output circuit broadly tuned to the frequency of the desired output signal, whereby the desired heterodyne frequency signal may be preferentially selected.

The system operates to combine the marker signal at 3.89 mc./sec. with the pilot carrier signal at a nominal frequency of 50 mc./sec. to produce a first heterodyne signal at a frequency of approximately 53.89 mc./sec. This heterodyne signal, it will be noted, exhibits, about a fixed phase reference established by the marker signal, frequency variations as determined by variations of the scanning rate of the indexing regions of the beam intercepting screen of the tube 10, which produce corresponding variations of the frequency of oscillator 62 as previously described.

By means of the mixer 96 this heterodyne signal is in turn combined with the chromaticity information existing at a subcarrier frequency of approximately 3.89 mc./sec. to produce a second heterodyne signal at 50 mc./sec., which signal exhibits the phase and amplitude variations of the chromaticity signal and the frequency variations established by the variations of the scanning rate of the indexing regions, and hence of the color triplets of the screen, these variations being established with reference to a given time phase position as determined by the color marker signal energizing the oscillator 92.

The 50 mc./sec. signal so produced is in turn adapted to the requirements of the color image screen of the tube 10 by means of the mixer 98 to which there is also supplied a signal at 57 mc./sec. derived from the output of amplifier 64. The so combined signals produce at the output of the mixer 98 a signal at 7 mc./sec. exhibiting the amplitude, phase and frequency variations of the signal from the mixer 98, so that the time phase position as well as the nominal frequency of the color information contained therein is in conformity to the requirements of the image screen of the tube 10.

When the information at the output of the low pass filter 84, and the chromaticity information appearing on the color subcarrier derived from bandpass filter 86, are in terms of the imaginary color primaries X, Y and Z, as takes place in the preferred receiving system above specifically described, it may be necessary to modify these signals to make them conform to the particular real primary colors, R, G and B characterizing the phosphor stripes utilized in the screen assembly 40 (see Figure 2) of the cathode-ray tube. This may be accomplished by synchronously detecting a signal having the color information at a particular phase and adding the detection products in proper relative amounts to the imaginary color primary signals in the adder 88. In Figure 1 this is accomplished by a heterodyne mixer 100 to which are applied the signal at the output of mixer 96 and a signal from the pilot oscillator 62. The mixer 100, which may consist of a dual grid tube as in the case of the mixers previously described, may include a conventional phase shifter for either or both of the input signals thereto to vary the relative phases of the signals, and may further include an amplifier in the output circuit to establish the amplitude of the input signal at the proper value relative to the amplitudes of the signals supplied to the adder 88 from the low pass filter 84 and from the mixer 98. As will be apparent to those skilled in the art, the actual value of the phase shift and the amplification which takes place in the mixer 100 are determined by the particular primary colors produced by the cathode-ray tube 10 and these quantities may be readily calculated.

While the invention has been described with reference to the use of a color image producing tube 10 having two individual beams which are deflected in synchronism and an individually controlled intensity, as described in the Partin application above referred to, it is apparent that the invention is equally applicable to systems in which the image tube contains a single beam. In the latter case all of the signals supplied to the image tube may be applied to the same control electrode to correspondingly simultaneously vary the intensity of the beam.

While I have described my invention by means of specific examples and in a specific embodiment, I do not wish to be limited thereto for obvious modifications will occur to those skilled in the art without departing from the spirit and scope of the invention.

What I claim is:

1. In an electrical system comprising a cathode-ray tube having a source of electrically charged particles and a beam intercepting member, means for varying the flow of said charged particles from said source, said beam intercepting member comprising a plurality of first areas having a first given response characteristic upon impingement by said charged particles and comprising second areas having a second given response characteristic upon impingement by said charged particles different from the response characteristics of said first areas, said second areas being arranged in a geometrical configuration indicative of the geometrical configuration of said first areas, means for scanning said charged particles in beam formation across said first and second areas at a given nominal rate and during consecutive scanning intervals thereby to energize said first and second areas, means for applying a signal wave to said flow varying means thereby to produce variations of the response of said first areas, means for deriving from said beam intercepting member during a given scanning interval a control quantity having variations as determined by variations of the scanning rate of said second areas during said given scanning interval, and means responsive to said control quantity for controlling the relationship between said signal wave and the position of said beam during a scanning interval subsequent to said given scanning interval.

2. An electrical system as claimed in claim 1 wherein said means for controlling the relationship between said signal wave and the position of said beam during said subsequent scanning interval comprises a time delay network adapted to produce in said system a delay period substantially equal to $n$ times the period of said scanning interval, where $n$ is an integer.

3. An electrical system as claimed in claim 2 further comprising means for continuously regenerating the said control quantity supplied to said delay network during consecutive scanning intervals.

4. An electrical system as claimed in claim 1 wherein said means for deriving said control quantity from said beam intercepting member comprises means for further varying the flow of said charged particles at a given nominal rate, and wherein said means responsive to said control quantity for controlling the relationship between said signal wave and the position of said beam comprises means responsive to said control quantity to angle modulate the said given nominal rate of further varying the flow of said charged particles.

5. An electrical system as claimed in claim 4 further comprising means for deriving from said beam intercepting member during scanning intervals subsequent to said given scanning interval consecutive signals having variations as determined by variations of the rate of scanning of said second areas during consecutive scanning intervals, and means for combining said last mentioned signals with said control quantity thereby to modify the variations of said control quantity.

6. A cathode-ray tube system comprising a cathode-ray tube having a source of electrons, means for controlling the intensity of electron flow from said source and an electron beam intercepting member, said beam intercepting member comprising a plurality of first areas having a first given response characteristic upon electron impingement and comprising second areas having a second given response characteristic upon electron impingement different from the response characteristic of said first areas, said second areas being arranged in a geometrical configuration indicative of the geometrical configuration of said first areas, means for scanning said electrons in beam formation across said first and second areas at a given nominal rate and during consecutive scanning intervals thereby to energize said first and second areas during said scanning intervals, means for applying to said control means a first wave having variations indicative of desired variations of the response of said first areas, means for applying to said control means a second wave having a given nominal frequency value, means for deriving from said beam intercepting member during a given scanning interval a signal quantity determined by the response characteristic of said second areas, said signal quantity having a nominal frequency determined by the frequency of said second wave and by the nominal rate of scanning said second areas and having variations about said nominal frequency value as determined by variations of the rate of scanning said second areas, means for deriving from said signal quantity a control signal having variations as determined by variations of said signal quantity during said given scanning interval, and means responsive to said control quantity to angle modulate said second wave during a scanning interval subsequent to said given scanning interval.

7. A cathode-ray tube system as claimed in claim 6 wherein said means to angle modulate said second wave during a scanning interval subsequent to said given scanning interval comprises means for imparting a time delay to said control quantity, said time delay having a value substantially equal to $n$ times the period of said scanning intervals, where $n$ is an integer.

8. A cathode-ray tube system as claimed in claim 6 further comprising means for regenerating the said control quantity during consecutive scanning intervals.

9. A cathode-ray tube system as claimed in claim 8 wherein said means to derive said control quantity during said given scanning interval is adapted to derive from said beam intercepting member, during scanning intervals subsequent to said given scanning interval, consecutive signals having variations as determined by variations of the rate of scanning of said second areas during said consecutive scanning intervals, and wherein said deriving means comprises means for combining said last mentioned signals with said control quantity during scanning intervals following said given scanning interval thereby to modify the variations of said control quantity.

10. A cathode-ray tube system as claimed in claim 6 further comprising means responsive to said control quantity for controlling the relationship between the phase of said first wave and the position of said beam on said beam intercepting member.

11. A cathode-ray tube system as claimed in claim 10 wherein said means for controlling the relationship between the phase of said first wave and the position of said beam comprises means responsive to said control quantity for angle modulating said first wave.

12. A cathode-ray tube system comprising a cathode-ray tube having a source of electrons, means for controlling the intensity of electron flow from said source and an electron beam intercepting member, said beam intercepting member comprising a plurality of first areas having a first given response characteristic upon electron impingement and comprising second areas having a second given response characteristic upon electron impingement different from the response characteristic of said first areas, said second areas being arranged in a geometrical configuration indicative of the geometrical configuration of said first areas, means for scanning said electrons in beam formation across said first and second areas at a given nominal rate and during consecutive scanning intervals thereby to energize said first and second areas during said scanning intervals, means for applying to said control means a first wave having variations indicative of desired variations of the response of said first areas, a source of a second wave having a given nominal frequency, means for applying said second wave to said control means, a selective signal transmission path coupled to said beam intercepting member and adapted to derive from said beam intercepting member a signal quantity having a frequency determined by the frequency of said second wave and by the rate of scanning said second areas, a frequency sensitive detector coupled to said transmission path and adapted to produce a control quantity having amplitude variations as determined by frequency variations of said signal quantity about a given nominal frequency value, a time delay network having an input circuit coupled to said detector and having an output circuit, said network, in combination with said selective transmission path, having a transmission delay period substantially equal to $n$ times the period of one of said scanning intervals where $n$ is an integer, signal regenerating means shunting said network and adapted to reapply the output signal of said network to the input circuit thereof, means coupled to the output circuit of said network and to said source of said second wave and adapted to vary the frequency of said second wave in a sense so as to maintain the frequency of said signal quantity substantially constant, and means for controlling the relationship between the phase of said first wave and the position of said beam in response to amplitude variations of said control quantity at the output of said network.

13. A cathode-ray tube system as claimed in claim 12 wherein said means for controlling the relationship between the phase of said first wave and the position of said beam comprises means to derive from said source of said second wave a control signal having a frequency proportional to the frequency of said second wave, and means to heterodyne said control signal and said first wave.

14. A cathode-ray tube system for reproducing a color television image as defined by a color video wave indicative of visual aspects of said image, said system comprising a cathode-ray tube having an electron beam intercepting member, means for generating electrons and for directing the same in beam formation towards said beam intercepting member and means for varying the flow of electrons from said generating means, said intercepting member comprising first portions, each comprising a plurality of stripes of fluorescent material arranged in substantially parallel relationship, said stripes being adapted to produce light of different colors in response to electron impingement, and said member further comprising second portions spaced apart substantially parallel to said fluorescent stripes and having a response characteristic upon electron impingement different from the response characteristic of said first portions; means for scanning said electrons in beam formation across said beam intercepting member at a given nominal rate thereby to energize said first and second portions; means for applying said color video wave to said electron flow varying means thereby to produce variations of the response of said first portions; means for applying to said control means a second wave having a given nominal frequency value; means for deriving from said beam intercepting member, during a given scanning interval, a signal quantity determined by the response characteristic of said second portions, said signal quantity having a frequency determined by the frequency of said second wave and by the rate of scanning said second portions and undergoing frequency variations relative to the frequency of said second wave as determined by variations of the rate of scanning said second portions; means for deriving from said signal quantity a control signal having variations as determined by variations of said signal quantity during said given scanning interval; and means responsive to said control quantity to angle modulate said second wave during a scanning interval subsequent to said given scanning interval in a sense such as to maintain the frequency of said signal quantity at a substantially constant value during said subsequent scanning interval.

15. A cathode-ray tube system as claimed in claim 14 wherein said means for applying said second wave to said control means comprises a variable frequency wave source; wherein said means responsive to said control quantity to angle modulate said second wave during a scanning interval subsequent to said given scanning interval comprises a delay network having an input circuit coupled to said control signal deriving means and an output circuit, and a variable reactance system coupled to said output circuit and adapted to vary the frequency of said second wave source, said network, in combination with said control signal deriving means, having a transmission delay substantially equal to $n$ times the period of one of said scanning intervals where $n$ is an integer; said cathode-ray tube system further comprising signal regenerating means shunting said delay network and adapted to reapply the output signal of said network to the input thereof, and means coupled to said second wave source for varying the frequency of said first wave in synchronism with the frequency variations of said second wave.

References Cited in the file of this patent

UNITED STATES PATENTS

| | | |
|---|---|---|
| 2,635,141 | Bedford | Apr. 14, 1953 |
| 2,644,855 | Bradley | July 7, 1953 |
| 2,648,722 | Bradley | Aug. 11, 1953 |

UNITED STATES PATENT OFFICE

CERTIFICATE OF CORRECTION

April 15, 1958

Patent No. 2,831,052

Wilson P. Boothroyd

It is hereby certified that error appears in the printed specification of the above numbered patent requiring correction and that the said Letters Patent should read as corrected below.

Column 1, line 26, for "strips" read -- stripes --; column 2, line 18, for "strips" read -- stripe --; line 63, for "cathode-way" read -- cathode-ray --; column 5, line 22, for "volting" read -- voltage --; lines 57 and 70, each occurrence, for "strips" read -- stripes --; line 73, for "insulting" read -- insulating --; line 74 and column 6, line 2, for "strips" read -- stripes --; column 8, line 52, for "processes" read -- processed --; line 55, for "not withstanding" read -- notwithstanding -- column 9, line 1, for "interval" read -- intervals --.

Signed and sealed this 6th day of October 1959.

(SEAL)
Attest:

KARL H. AXLINE
Attesting Officer

ROBERT C. WATSON
Commissioner of Patents